Patented July 29, 1941

2,250,483

UNITED STATES PATENT OFFICE 2,250,483

FIREPROOFING COMPOSITION AND METHOD

Harry Hopkinson, Watertown, Mass.

No Drawing. Application August 10, 1937, Serial No. 158,373

16 Claims. (Cl. 134—78.6)

This invention relates to fluids adapted to fireproof fibres, fabrics, wood, cellulose films, and other materials, and to a method of treating such materials to fireproof the same. By "fireproofing" of materials is meant rendering the materials incapable of supporting a flame after the source is removed.

Fireproofing is customarily effected by impregnating the material with one or more salts which, when exposed to a flame, fuse to form a fireproof coating about the fibers of the material, or emit flame-smothering gases, or both. With materials, such as awnings, tarpaulins, wood and the like, which are exposed to the weather during use, the fireproofing salts must be insoluble in rainwater and should be fixed on the material in such a way that they do not dust out on weathering.

The insolubility in water of such fireproof and weatherproof salts has heretofore necessitated the treatment of the material successively with a number of aqueous solutions of water-soluble salts to precipitate the water-insoluble salt in the fabric by the reaction between the several water-soluble salts. A still further treatment with a different bath has usually been required for the fixation of the salts with varnish.

The objects of this invention are to simplify, materially, such treatment, by eliminating the numerous successive baths and, secondly, to provide, as a new product, a solution which alone may be used as a bath for depositing fireproofing water-soluble salts which will, by double decomposition, produce a water-insoluble fireproof salt on exposure to water, and preferably also a binding varnish or lacquer for said salts. The solution provided by my invention has self-preservative qualities and, accordingly, can be shipped in containers and sold for use in the field.

My novel bath consists of an organic solution of the components of a water-insoluble fireproof salt, from which bath the salt can be precipitated by treatment with water. The components of the salt, furthermore, preferably themselves comprise fireproofing salts (which I shall refer to as the initial salts) each of which is readily soluble in an organic solvent to produce solutions which are miscible with each other, thereby forming the bath. A unique characteristic of such a bath is that it eliminates entirely, as a necessary part of the fireproofing treatment, any active step of forming the water-insoluble salt after the initial salts have been deposited on the fabric. I have found that atmospheric moisture will produce that reaction while the fabric is in use. Before exposure to rain, the fabric is fireproofed as the salts which have been deposited on the fabric from the bath are each fireproofing in character and, although each of these initial salts alone may be water-soluble, they will not be washed away by the rain as their presence together, and with rainwater, causes double decomposition producing the water-insoluble salt.

There are numerous combinations of fireproofing salts adapted to form a water-insoluble fireproofing salt by double decomposition in the presence of water, for example, any water-soluble zinc, aluminum, manganese, or magnesium salt in combination with any water-soluble borate, phosphate, carbonate, tungstate, fluoride, or silicate. Of such salts, I have found most satisfactory for my purposes and prefer to employ as the initial salts, zinc chloride and borax.

There are numerous organic solvents for one or more of the salts enumerated above. Among them may be mentioned ethylene glycol mono ethyl ether, diethylene glycol mono ethyl ether, acetamide, triethanolamin, glycerol, tricresylphosphate, and the like. In preparing a bath of the initial salts, according to my invention, organic solvents should be employed which will produce solutions of the several salts which are readily miscible without producing the water-insoluble precipitate. When employing zinc chloride and borax as the initial salts, I have found that use of ethylene glycol mono ethyl ether as the solvent for the zinc chloride and diethylene glycol mono ethyl ether as the solvent of the borax is most satisfactory for producing a mixed bath having these properties.

As stated, a varnish or lacquer is preferably used to bind the salts where the impregnated fabrics are to be exposed to weathering and, as a binder, I prefer to use chlorinated rubber because it does not readily carry a flame. I have also found that the combination of a zinc salt and chlorinated rubber is particularly efficacious for fireproofing purposes. Other binders may, however, be employed, such as ethyl cellulose, cellulose acetate, cellulose acetobutyrate, and the like.

In making up the solution, care should be taken to employ sufficient quantity of the solvents to avoid jelling of the mixture on standing and to assure adequate penetration of the bath into the material being treated.

As specific examples of formulae which may be employed to produce the novel fireproofing solutions of my invention, I give the following:

1. Solution containing a binder for the salts: I prefer first to make a solution of the binder and add to it the solutions of the initial salts. When employing chlorinated rubber as the binder, the solvent thereof may consist approximately of the following:

| | Parts |
|---|---|
| Xylol | 284 |
| Ethylene glycol mono ethyl ether | 193 |

The above solvents are mixed well together and to the mixture is added chlorinated rubber in approximately 120 parts by weight. The solution is then agitated until the chlorinated rubber is completely dissolved.

To the solution thus obtained, I preferably add a plasticizer such as tricresyl phosphate, 180 parts, with stirring.

In a separate container, mix well together:

| | Parts |
|---|---|
| Zinc chloride | 78 |
| Ethylene glycol mono ethyl ether | 210 |

Add 72 parts of the resultant solution to the full amount of the binder solution obtained as above.

In still a third container, mix thoroughly:

| | Parts |
|---|---|
| Borax | 57.6 |
| Diethylene glycol mono ethyl ether | 288 |

86.4 parts of the borax solution added to the combined binder and zinc chloride solution, with stirring, completes the fireproofing bath. Coloring matter can be added, if desired.

2. Solution without binder for the salts: Mix together thoroughly in a container:

| | Parts |
|---|---|
| Zinc chloride | 78 |
| Ethylene glycol mono ethyl ether | 210 |

In a separate container, mix thoroughly:

| | Parts |
|---|---|
| Borax | 57.6 |
| Diethylene glycol mono ethyl ether | 288 |

Mix the two solutions together in approximately the proportion of 72 parts of the zinc chloride solution to 86.4 parts of the borax solution and thin with about 180 parts ethylene glycol mono ethyl ether.

While in the above formulae I have illustrated preferred embodiments of my invention, it is obvious that I do not intend to limit myself to the specific ingredients or proportions therein mentioned, for, with these formulae as a guide, those skilled in the art may readily produce other solutions having the novel properties of my invention by variations in the proportions of the exemplary formulae or by substitution of other similar ingredients from the classes enumerated, bearing in mind the necessary attributes thereof as previously set forth.

The treatment of a fabric with fireproofing solutions of my invention is extremely simple and may consist merely in immersing the fabric in the solution for a sufficient period to wet the fabric thoroughly, then removing the excess solution from the surface of the fabric and drying the same. Or, if desired, the solution may be applied in situ by means of a spray or brush or other recognized means of application. In the case of light weight fabrics, a single application of the solution should prove sufficient, but in the case of heavy weight fabrics more than one application may be necessary to assure complete fireproofing.

It will be observed that as a result of this treatment there are deposited on the fabric, and, because of the organic solvents, thoroughly impregnated therein, salts, in the case of the illustrative formulae, zinc chloride and borax, which render the fabric highly resistant to flame propagation. Although each of the salts is water-soluble, exposure of the fabric to water upon subsequent use will not wash the salts away but will produce the double decomposition precipitating an insoluble, fireproofing salt.

I claim:

1. A fireproofing liquid containing, in organic solution, a water soluble metallic fireproofing salt and a water soluble borate which react together, in the presence of water, to form a water-insoluble fireproofing borate.

2. A fireproofing solution containing zinc chloride, borax and chlorinated rubber, dissolved in compatible organic solvents.

3. The method of fireproofing a material which consists in saturating the material with a liquid organic solution of water-soluble fireproofing salts capable of reaction together in water to precipitate a water-insoluble fireproofing salt, depositing the salts in the material by evaporation of the solvent and thereafter exposing the treated material to water to precipitate the water-insoluble salt by reaction of said water-soluble salts.

4. A fireproofing liquid containing a plurality of water soluble inorganic fireproofing salts capable of double decomposition in the presence of water to form a water insoluble fireproofing precipitate, each of said salts being in solution in a different organic solvent producing solutions that are miscible with each other.

5. A fireproofing liquid containing, in solution with a binder, a plurality of water soluble inorganic fireproofing salts capable of double decomposition in the presence of water to form a water insoluble fireproofing precipitate, each of said salts and the binder being in solution in miscible organic solvents.

6. A fireproofing liquid containing, in solution with chlorinated rubber, a plurality of water soluble inorganic fireproofing salts capable of double decomposition in the presence of water to form a water insoluble fireproofing precipitate, the chlorinated rubber and each of said salts being in solution in miscible organic solvents.

7. A fireproofing liquid comprising a solution in an organic solvent of a plurality of water soluble inorganic salts at least one of which is fireproofing capable of double decomposition in the presence of water to form a water insoluble fireproofing salt selected from the group consisting of borates, phosphates and carbonates of metals selected from the group consisting of zinc, aluminum, manganese and magnesium.

8. A fireproofing liquid containing zinc chloride dissolved in ethylene glycol mono ethyl ether and borax dissolved in diethylene glycol mono ethyl ether.

9. A fireproofing liquid containing chlorinated rubber dissolved in a mixture of xylol and ethylene glycol mono ethyl ether, zinc chloride dissolved in ethylene glycol mono ethyl ether and borax dissolved in diethylene glycol mono ethyl ether.

10. A fireproofing liquid as defined in claim 9, which also includes a plasticizer.

11. A fireproofing liquid containing both zinc chloride and borax in substantially neutral solution.

12. A fireproofing liquid containing both zinc chloride and borax in organic solution.

13. A fireproofing liquid containing both zinc chloride and borax in substantially neutral, non-aqueous solution.

14. A fireproofing liquid containing a water soluble fireproofing salt of the class of metals chosen from the group consisting of zinc, magnesium, manganese and aluminum in solution in a solvent chosen from the group consisting of ethylene glycol mono ethyl ether, diethylene glycol mono ethyl ether and glycerol, and a water soluble salt chosen from the group consisting of water soluble borates and carbonates in solution in a solvent chosen from the group consisting of acetamide, diethylene glycol mono ethyl ether and glycerol.

15. A fireproofing liquid as defined in claim 14 which also includes in solution a binder chosen from the group consisting of chlorinated rubber, ethylcellulose, cellulose acetate and cellulose acetobutyrate.

16. A neutral organic fireproofing liquid containing a salt chosen from the group consisting of water soluble zinc, aluminum, manganese and magnesium salts dissolved in a liquid organic solvent and a salt chosen from the group consisting of water soluble borates, phosphates, carbonates, tungstates, fluorides and silicates dissolved in organic solvent, said salts being adapted to react with each other in the presence of water to precipitate a water insoluble fireproofing salt.

HARRY HOPKINSON.